United States Patent
Mercer et al.

(10) Patent No.: US 11,662,138 B2
(45) Date of Patent: May 30, 2023

(54) WATER CIRCUIT ASSEMBLY FOR A REFRIGERATOR

(71) Applicant: Electrolux Do Brasil S.A., Curitiba (BR)

(72) Inventors: Israel Mercer, Curitiba (BR); Victor Batista, Curitiba (BR); Rafael Leidens, Curitiba (BR); Alcione Colecha, Curitiba (BR); Guilherme Picanço, Curitiba (BR)

(73) Assignee: Electrolux do Brasil S.A., Curitiba (BR)

( * ) Notice: Subject to any disclaimer, the term of this patent is extended or adjusted under 35 U.S.C. 154(b) by 199 days.

(21) Appl. No.: 16/971,892

(22) PCT Filed: Mar. 2, 2018

(86) PCT No.: PCT/BR2018/050049
§ 371 (c)(1),
(2) Date: Aug. 21, 2020

(87) PCT Pub. No.: WO2019/165517
PCT Pub. Date: Sep. 6, 2019

(65) Prior Publication Data
US 2021/0108853 A1    Apr. 15, 2021

(51) Int. Cl.
*F25D 23/12*    (2006.01)

(52) U.S. Cl.
CPC ...... *F25D 23/126* (2013.01); *F25D 2323/121* (2013.01)

(58) Field of Classification Search
CPC .. F25D 23/126; F25D 2323/121; C02F 1/001; C02F 9/005; C02F 2307/10; B01D 29/96; B01D 35/02; B01D 35/147
See application file for complete search history.

(56) References Cited

U.S. PATENT DOCUMENTS

| | | |
|---|---|---|
| 3,982,406 A | 9/1976 | Hanson et al. |
| 4,915,831 A | 4/1990 | Taylor |
| 5,135,645 A | 8/1992 | Sklenak et al. |

(Continued)

OTHER PUBLICATIONS

International Search Report and Written Opinion for International Application No. PCTBR/2018/050049, dated Mar. 29, 2019, 12 pages.

(Continued)

*Primary Examiner* — Cassey D Bauer
(74) *Attorney, Agent, or Firm* — Pearne & Gordon LLP

(57) ABSTRACT

A water circuit assembly for a refrigerator that delivers water from a source to a first destination and a second destination spaced apart from the first destination. The water circuit assembly includes an inlet valve positioned outside a compartment of the refrigerator and a water filter assembly positioned adjacent a top wall and a first side wall of a liner that defines the compartment. The water circuit further includes a bracket secured to a rear wall of the liner, a water tank supported by the bracket along the rear wall of the liner, and a diverter valve attached to the bracket and fluidly connected to the inlet valve to thereby divert the flow of water from the inlet valve to a selected one of the first destination or the second destination.

15 Claims, 11 Drawing Sheets

(56) References Cited

U.S. PATENT DOCUMENTS

| | | | |
|---|---|---|---|
| 5,707,518 A * | 1/1998 | Coates | B01D 35/153 |
| | | | 210/232 |
| 5,813,245 A | 9/1998 | Coates et al. | |
| 6,120,685 A | 9/2000 | Carlson et al. | |
| RE37,216 E | 6/2001 | Koslow | |
| 6,276,146 B1 | 8/2001 | Kim et al. | |
| 6,303,031 B1 | 10/2001 | Senner | |
| 6,355,177 B2 | 3/2002 | Senner | |
| 6,375,834 B1 | 4/2002 | Guess et al. | |
| 6,460,367 B1 | 10/2002 | DuHack | |
| 6,613,236 B1 | 9/2003 | Guess et al. | |
| 6,622,509 B2 | 9/2003 | Stich et al. | |
| 6,640,481 B1 | 11/2003 | Williams, Jr. | |
| 6,810,682 B1 | 11/2004 | Schuchart et al. | |
| 6,973,803 B2 | 12/2005 | Olive et al. | |
| 7,000,894 B2 | 2/2006 | Olson et al. | |
| 7,056,435 B2 | 6/2006 | Jenkins et al. | |
| 7,067,054 B2 | 6/2006 | Fritze | |
| 7,083,725 B2 | 8/2006 | Jenkins et al. | |
| 7,147,773 B2 | 12/2006 | Mitchell et al. | |
| 7,188,486 B2 | 3/2007 | Olive et al. | |
| 7,194,872 B2 | 3/2007 | Kim et al. | |
| 7,228,701 B2 | 6/2007 | Kim et al. | |
| 7,284,390 B2 | 10/2007 | Van Meter et al. | |
| 7,287,397 B2 | 10/2007 | Coulter et al. | |
| 7,387,725 B2 | 6/2008 | Choi et al. | |
| 7,442,301 B2 | 10/2008 | Huda | |
| 7,491,327 B2 | 2/2009 | Jenkins et al. | |
| 7,568,357 B2 | 4/2009 | Jenkins, Jr. et al. | |
| 7,603,869 B2 | 10/2009 | Kim et al. | |
| 7,805,956 B2 | 10/2010 | Kwon | |
| 7,866,165 B2 | 1/2011 | Jang et al. | |
| 8,020,403 B2 | 9/2011 | Rotter et al. | |
| 8,028,534 B2 | 10/2011 | Jenkins, Jr. et al. | |
| 8,097,156 B2 | 1/2012 | Tubby et al. | |
| 8,137,551 B1 | 3/2012 | Huda et al. | |
| 8,627,675 B2 | 1/2014 | Kruckenberg et al. | |
| 8,783,055 B2 | 7/2014 | Yang et al. | |
| 8,833,100 B2 | 9/2014 | Meyerholtz et al. | |
| 8,955,349 B2 | 2/2015 | Mitchell et al. | |
| 9,027,361 B2 | 5/2015 | Shaffer et al. | |
| 9,046,299 B2 | 6/2015 | An | |
| 9,115,920 B2 | 8/2015 | An | |
| 9,170,040 B2 | 10/2015 | An | |
| 9,216,914 B2 | 12/2015 | An | |
| 9,222,721 B2 | 12/2015 | Kim | |
| 9,222,722 B2 | 12/2015 | Kim et al. | |
| 9,314,716 B2 | 4/2016 | Patera et al. | |
| 9,327,216 B2 | 5/2016 | Patera et al. | |
| 9,487,414 B2 | 11/2016 | An | |
| 2005/0178273 A1 | 4/2005 | Meuleners et al. | |
| 2006/0086133 A1 | 4/2006 | Olive et al. | |
| 2006/0191827 A1 | 8/2006 | Fritze | |
| 2006/0254971 A1 | 11/2006 | Tubby et al. | |
| 2007/0012611 A1 | 1/2007 | An | |
| 2007/0227959 A1 | 10/2007 | Sinur et al. | |
| 2008/0185330 A1 | 4/2008 | Sinur et al. | |
| 2008/0104977 A1 | 5/2008 | Coulter et al. | |
| 2008/0156015 A1 | 7/2008 | Meyerholtz et al. | |
| 2008/0271475 A1 | 11/2008 | Wuesthoff et al. | |
| 2010/0018238 A1 | 1/2010 | Gemer et al. | |
| 2010/0126210 A1 * | 5/2010 | Rotter | F25D 27/00 |
| | | | 62/340 |
| 2011/0000237 A1 | 1/2011 | Wetekamp et al. | |
| 2012/0006829 A1 | 1/2012 | Jenkins, Jr. et al. | |
| 2012/0145621 A1 | 6/2012 | Tubby et al. | |
| 2013/0199214 A1 | 4/2013 | Coulter et al. | |
| 2015/0059399 A1 * | 3/2015 | Hwang | F25D 23/068 |
| | | | 312/405 |
| 2015/0198362 A1 | 7/2015 | An | |
| 2015/0224432 A1 | 8/2015 | An | |
| 2016/0047591 A1 | 2/2016 | Jeong et al. | |
| 2016/0101989 A1 * | 4/2016 | An | C02F 1/003 |
| | | | 210/254 |
| 2016/0231046 A1 | 4/2016 | Tae et al. | |
| 2016/0244337 A1 | 4/2016 | Patera et al. | |
| 2016/0223251 A1 | 8/2016 | Yun et al. | |
| 2016/0341462 A1 | 11/2016 | Kim | |

OTHER PUBLICATIONS

Brazilian OA for patent application for BR112020017858-6, dated Jul. 12, 2022, 4 pages.

* cited by examiner

WATER CIRCUIT ASSEMBLY FOR A REFRIGERATOR

This application is a U.S. National Phase application of PCT International Application No. PCT/BR2018/050049, filed Mar. 2, 2018, which is incorporated by reference herein.

CROSS-REFERENCE TO RELATED APPLICATIONS

None

FIELD OF THE INVENTION

This application relates generally to a water circuit assembly for a refrigeration appliance, and more particularly, to a refrigeration appliance including a water filter assembly and water tank.

BACKGROUND OF THE INVENTION

Conventional refrigeration appliances, such as domestic refrigerators, typically have both a fresh food compartment and a freezer compartment or section. The fresh food compartment is where food items such as fruits, vegetables, and beverages are stored and the freezer compartment is where food items that are to be kept in a frozen condition are stored. The refrigerators are provided with a refrigeration system that maintains the fresh food compartment at temperatures above 0° C., such as between 0.25° C. and 4.5° C. and the freezer compartments at temperatures below 0° C., such as between 0° C. and −20° C.

The arrangements of the fresh food and freezer compartments with respect to one another in such refrigerators vary. For example, in some cases, the freezer compartment is located above the fresh food compartment and in other cases the freezer compartment is located below the fresh food compartment. Additionally, many modern refrigerators have their freezer compartments and fresh food compartments arranged in a side-by-side relationship. Whatever arrangement of the freezer compartment and the fresh food compartment is employed, typically, separate access doors are provided for the compartments so that either compartment may be accessed without exposing the other compartment to the ambient air.

Some refrigerators include a water dispenser either within the fresh food compartment or on an external surface of the refrigerator (e.g., a door). Additionally, some refrigerators include an ice maker positioned within the fresh food compartment or the freezer compartment of the refrigerator. The water dispenser and/or ice maker is supplied with water from an external water source (i.e., outside of the refrigerator) and is fluidly connected thereto via a water circuit. The water circuit may include a variety of elements (e.g., filters, storage tanks, valves, etc.) located at various positions within or external to the fresh food and/or freezer compartments of the refrigerator.

When a refrigerator includes both a water dispenser and an ice maker, a solenoid valve selectively controls the disbursement of water from the water source to multiple downstream valves which, in turn, route the flow of water to a desired destination (i.e., either the water dispenser or the ice maker). The multiple downstream valves are often positioned relatively close to the solenoid valve, thus each route must include its own elements (e.g., filters, tanks, etc.). This adds to the cost and complexity of manufacturing a refrigerator. Also, the placement of each element may have negative effects on the overall aesthetic of the fresh food and freezer compartments.

BRIEF SUMMARY OF THE INVENTION

In accordance with one aspect, there is provided a refrigerator including a cabinet wherein a liner defines a compartment within the cabinet. The liner includes a rear wall, first and second opposing side walls, and a top wall. The refrigerator further includes a water circuit assembly that delivers water from a source to a first destination and a second destination spaced apart from the first destination. The water circuit assembly includes a water filter assembly positioned adjacent the top wall and the first side wall of the liner and extends outward from the rear wall of the liner. The water filter assembly extends within the compartment. That is, the water filter assembly is positioned entirely within the compartment and extends in a direction outward and away from the rear wall of the liner. Further, a bracket is secured to the rear wall of the liner and positioned adjacent the top wall, the bracket extends between the first and second side walls of the liner. A water tank is supported by the bracket along the rear wall of the liner. Further still, a diverter valve is attached to the bracket and fluidly connected to the inlet valve to thereby divert the flow of water from the inlet valve to a selected one of the first destination or the second destination.

The refrigerator according to the foregoing aspect wherein the water circuit assembly further includes an inlet valve positioned outside the compartment, the inlet valve being configured to selectively permit a flow of water from the source to the water circuit assembly. The inlet valve is in fluid communication with the water filter assembly via a first tube. Also, the water filter assembly is in fluid communication with the water tank via a second tube. Further, the water tank is in fluid communication with the diverter valve via the third tube, and the diverter valve is in fluid communication with the first destination and the second destination via fourth and fifth tubes, respectively.

In the foregoing refrigerator, a first housing is secured to at least one of the top wall and the rear wall of the liner. The first housing extends in a covering relationship over the bracket so as to enclose the bracket and the water tank within the first housing.

In the refrigerator, the water tank is supported by the bracket by at least one arm that extends outwards from a front surface of the bracket.

In the foregoing refrigerator, an insulation member is positioned within the first housing and adjacent to the water tank. The insulation member includes a slot formed therein that accepts the arm extending from the front surface of the bracket such that, in an installed position, a top surface of the insulation member contacts a peripheral surface of the water tank.

In the refrigerator, a second housing is removably attached to the top wall and positioned about the water filter assembly so as to enclose the water filter assembly within the second housing. The second housing is pivotally connected to the first housing and the second housing rotates in a downward direction with respect to the first housing so as to provide access to the water filter assembly.

In the foregoing refrigerator, a door is pivotally connected to the cabinet. The door selectively provides access to the compartment. An external surface of the door includes a water dispenser. An ice maker is disposed within the compartment and secured to the top wall at a position adjacent the second side wall of the liner. The first destination and second destination are the water dispenser and the ice maker, respectively.

The bracket in the foregoing refrigerator includes at least one bend portion. The bend portion is defined by an inner curved wall extending outward from the front surface of the bracket and an outward curved wall extending outward from the front surface of the bracket. A uniform space is disposed between the inner curved wall and the outer curved wall. The inner curved wall and outer curved wall have a predetermined radial bend. A tube of the water circuit assembly is disposed within the uniform space positioned between the inner curved wall and the outer curved wall.

The refrigerator according to the foregoing aspect wherein the water filter assembly comprises a base member, a connection head removably secured to the base member, and a water filter removably secured to the connection head.

In the foregoing refrigerator, the top wall of the liner includes a panel having a bar vertically spaced below an inner surface of the panel and extending between opposing inner side surfaces of the panel. The base member of the water filter assembly includes a pair of arms, wherein each arm of the pair of arms includes a hook at a distal end thereof. In an installed position, the hook is disposed around the bar of the panel such that the engagement between the hook and the bar defines a first pivot point.

The refrigerator according to the foregoing aspect wherein the compartment within the cabinet includes a first compartment disposed vertically above a second compartment. The first compartment has a target temperature above zero degrees Centigrade. The refrigerator further comprises a partition dividing the second compartment into an upper compartment and a lower compartment. The lower compartment has a user-selectable target freezer temperature and the upper compartment has a user-selectable target variable climate zone temperature between a predetermined temperature below zero degrees Centigrade and a predetermined temperature above zero degrees Centigrade.

In accordance with another aspect, there is provided a refrigerator including a cabinet wherein a liner defines a compartment within the cabinet. The liner includes a rear wall, first and second opposing side walls, and a top wall. A water filter assembly is positioned adjacent and extends along the first side wall of the liner. The water filter assembly is pivotally connected to the top wall at a first pivot point. A first housing is secured to at least one of the top wall and the rear wall of the liner and extends between the first and second side walls of the liner. A second housing is positioned about the water filter assembly so as to enclose the water filter assembly within the second housing. The second housing is removably attached to the top wall of the liner and pivotally connected to the first housing at a second pivot point. The first pivot point is vertically and laterally offset from the second pivot point such that the second housing and the water filter assembly are independently rotatable in a downward direction with respect to the top wall of the liner.

The foregoing refrigerator further including a water tank positioned adjacent the rear wall and top wall of the liner. The first housing extends in a covering relationship over the water tank so as to enclose the water tank within the first housing.

The refrigerator according to the foregoing aspect wherein the water filter assembly comprises a base member, a connection head removably secured to the base member, and a water filter removably secured to the connection head.

In the foregoing refrigerator, the top wall of the liner includes a panel having a bar vertically spaced below an inner surface of the panel and extending between opposing inner side surfaces of the panel. The base member of the water filter assembly includes a pair of arms, wherein each arm of the pair of arms includes a hook at a distal end thereof. In an installed position, the hook is disposed around the bar of the panel such that the engagement between the hook and the bar defines the first pivot point.

The panel in the foregoing refrigerator includes a cylindrical anchor that extends vertically downward from the inner surface of the panel. The cylindrical anchor includes at least one flange member that extends radially outwards from a circumference of the cylindrical anchor.

The second housing in the foregoing refrigerator includes a support member that extends from an inner surface of the second housing. The support member includes a reception area that selectively accepts the cylindrical anchor therein. In a closed position, the cylindrical anchor is positioned within the reception area and a bottom surface of the support member contacts the at least one flange member so as to support the second housing in a vertical direction. In a rotating position, the cylindrical anchor is not positioned within the reception area so as to allow removal of the second housing from the panel.

In the foregoing refrigerator, the first housing includes a pair of laterally spaced rotation pins which face one another. Each rotation pin includes a flat top surface and a flat bottom surface.

The second housing in the foregoing refrigerator includes a pair of laterally spaced rotation mechanisms facing away from one another. Each rotation mechanism is formed into a rear portion of the second housing and includes a slot. The slot is defined between an upper extension and a vertically spaced lower extension. A closed circular end continuously connects the upper extension and the lower extension of the slot.

In the foregoing refrigerator, in the closed position, the pair of rotation pins of the first housing are positioned within the pair of rotation mechanisms formed into the rear portion of the second housing, respectively, such that the flat top surface and the flat bottom surface of each rotation pin are disposed adjacent the upper extension and lower extension of each slot, respectively. In the rotating position, the pair of rotation pins are positioned within the pair of rotation mechanisms, respectively, such that each rotation pin is positioned within the respective closed circular end. The engagement between each rotation pin and each closed circular end defines the second pivot point.

DESCRIPTION OF EXAMPLE EMBODIMENTS

Figure 1:
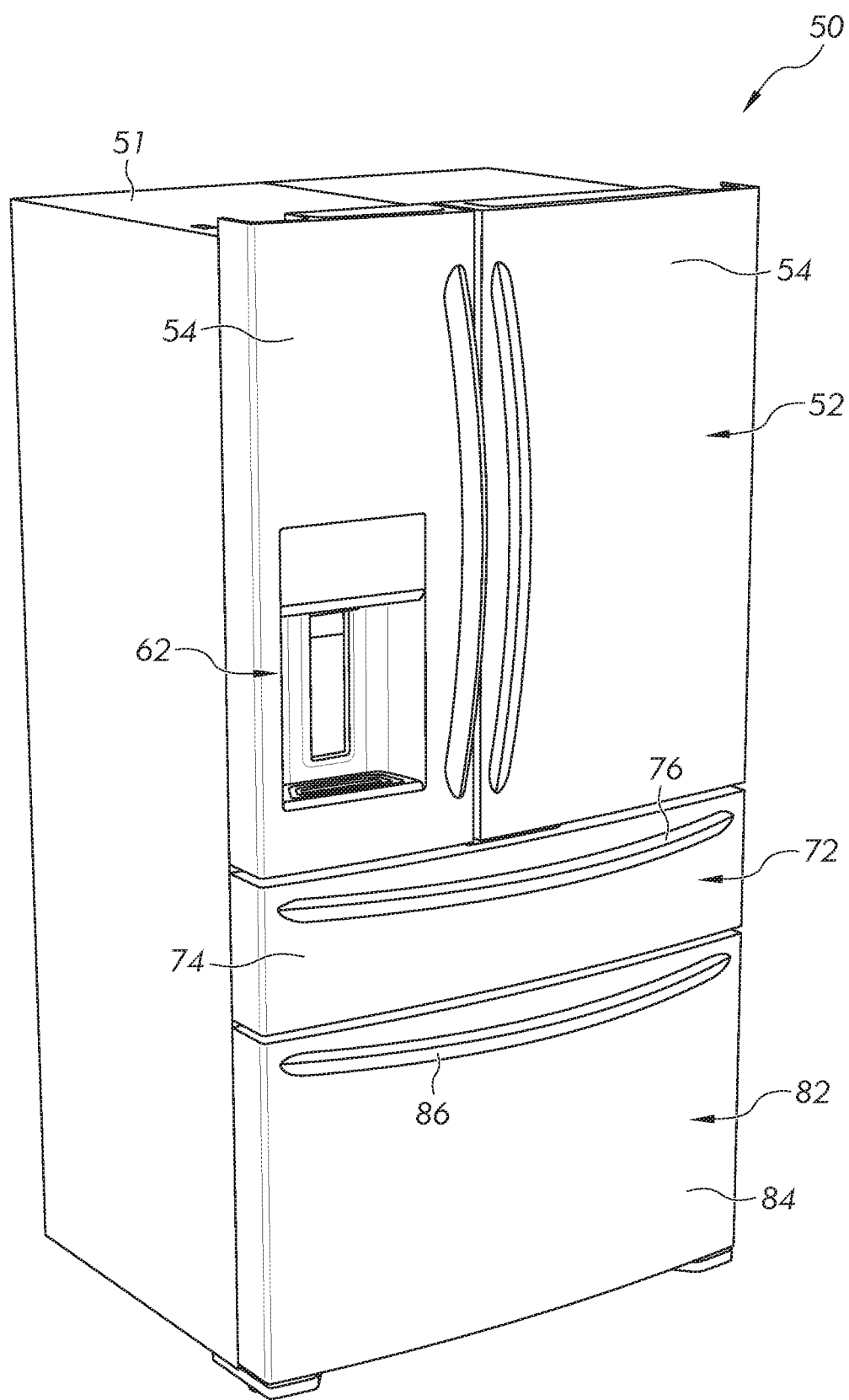
FIG. 1 is a front perspective view of a household French Door Bottom Mount refrigerator showing doors of the refrigerator in a closed position.

Referring now to the drawings, FIG. 1 shows a refrigeration appliance in the form of a domestic refrigerator, indicated generally at 50. Although the detailed description that follows concerns a domestic refrigerator 50, the invention can be embodied by refrigeration appliances other than with a domestic refrigerator 50. Further, an embodiment is described in detail below, and shown in the figures as a bottom-mount configuration of a refrigerator 50, including a fresh food compartment 52 disposed vertically above a variable climate zone (VCZ) compartment 72 and a freezer compartment 82.

Two doors 54 shown in FIG. 1 are pivotally coupled to a cabinet 51 of the refrigerator 50 to restrict and grant access to the fresh food compartment 52. The doors 54 are French-type doors that collectively span the entire lateral distance of the entrance to the fresh food compartment 52 to enclose the fresh food compartment 52. A center flip mullion 58 (FIG. 2) is pivotally coupled to at least one of the doors 54 to establish a surface against which a seal provided to the other one of the doors 54 can seal the entrance to the fresh food compartment 52 at a location between opposing side surfaces 56 (FIG. 2) of the doors 54. The mullion 58 can be pivotally coupled to the door 54 to pivot between a first orientation that is substantially parallel to a planar surface of the door 54 when the door 54 is closed, and a different orientation when the door 54 is opened. The externally-exposed surface of the center mullion 58 is substantially parallel to the door 54 when the center mullion 58 is in the first orientation, and forms an angle other than parallel relative to the door 54 when the center mullion 58 is in the second orientation. In the embodiment shown in FIG. 1, the seal and the externally-exposed surface of the mullion 58 cooperate at a position offset from a centerline midway between the lateral sides of the fresh food compartment 52. It is contemplated that the seal and the externally-exposed surface of the mullion 58 can cooperate approximately midway between the lateral sides of the fresh food compartment 52.

A dispenser 62 (FIG. 1) for dispensing at least ice pieces, and optionally water, can be provided on an exterior of one of the doors 54 that restricts access to the fresh food compartment 52. The dispenser 62 includes a lever, switch, proximity sensor or other device that a user can interact with to cause frozen ice pieces to be dispensed from an ice bin (not shown) of an ice maker 64 disposed within the fresh food compartment 52. Ice pieces from the ice maker 64 can exit the ice maker 64 through an aperture (not shown) and be delivered to the dispenser 62 via an ice chute (not shown), which extends at least partially through the door 54 between the dispenser 62 and the ice maker.

The refrigerator 50 includes an interior liner 53 (FIG. 2) that defines the fresh food compartment 52. The fresh food compartment 52 is located in the upper portion of the refrigerator 50 in this example and serves to minimize spoiling of articles of food stored therein. The fresh food compartment 52 accomplishes this by maintaining the temperature in the fresh food compartment 52 at a cool temperature that is typically above 0° C., so as not to freeze the articles of food in the fresh food compartment 52. It is contemplated that the cool temperature preferably is between 0° C. and 10° C., more preferably between 0° C. and 5° C. and even more preferably between 0.25° C. and 4.5° C. A separate fresh food evaporator (not shown) is dedicated to separately maintaining the temperature within the fresh food compartment 52 independent of the freezer compartment 82. According to an embodiment, the temperature in the fresh food compartment 52 can be maintained at a cool temperature within a close tolerance of a range between 0° C. and 4.5° C., including any subranges and any individual temperatures falling with that range. For example, other embodiments can optionally maintain the cool temperature within the fresh food compartment 52 within a reasonably close tolerance of a temperature between 0.25° C. and 4° C.

Figure 2:
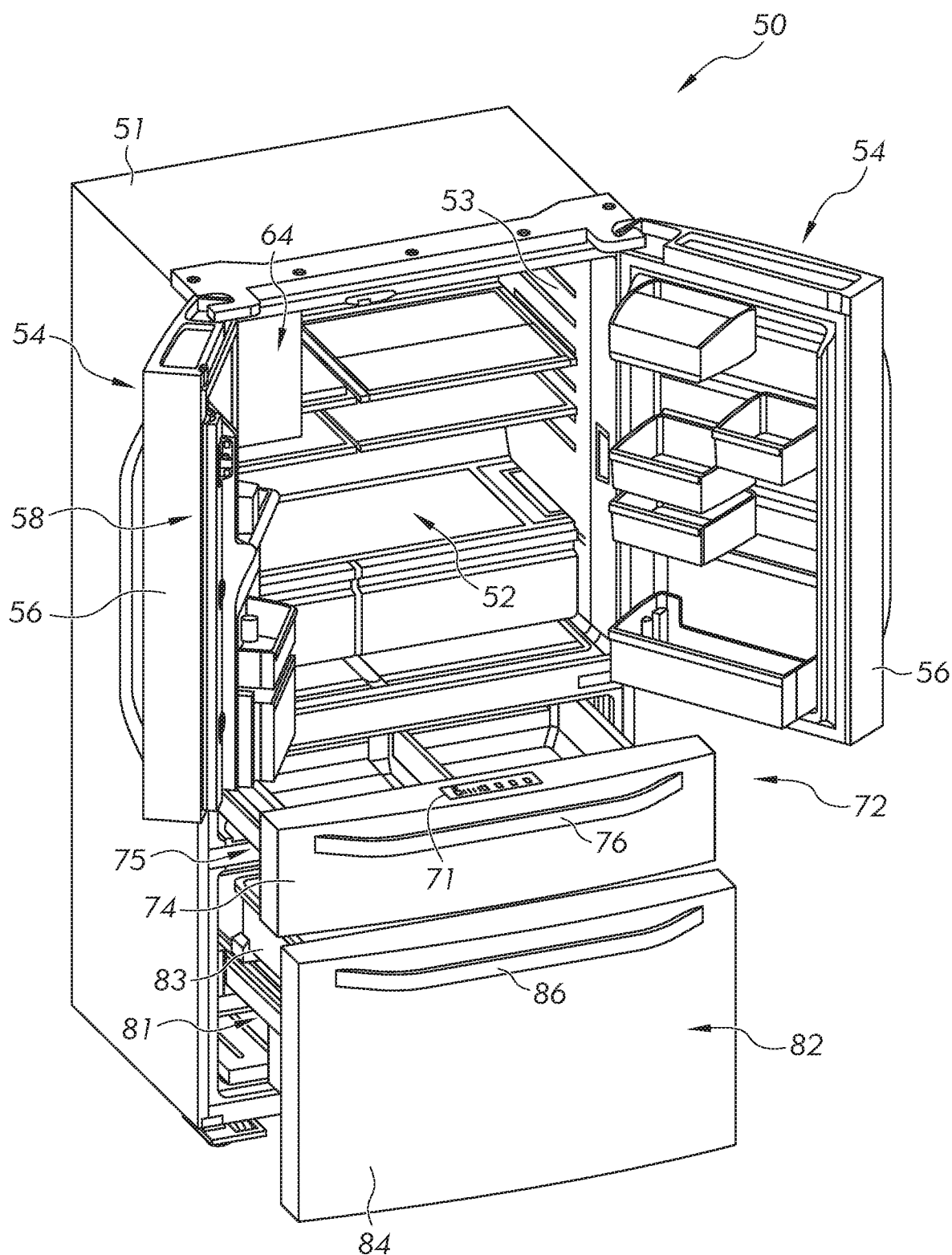
FIG. 2 is a front perspective view of the refrigerator of FIG. 1 showing doors of a fresh food compartment and drawers of a freezer compartment and a variable climate zone compartment in an opened position.

Referring to FIG. 2, the VCZ compartment 72 is arranged vertically beneath the fresh food compartment 52. The VCZ compartment 72 can operate at different user-selectable temperatures as either a refrigerator (i.e., above-freezing) or a freezer (i.e., below-freezing). A control unit or user interface 71 is disposed on a front panel 74 of the VCZ compartment 72 to allow a user the ability to selectively operate the VCZ compartment 72 at one of a variety of temperatures including both true fresh food and freezing temperatures, for example, −18° C., −12° C., −2 C, 0° C. and +4° C. The VCZ compartment 72 is fluidly in communication with the freezer compartment 82 and may include a heater (not shown) for heating the air conveyed to the VCZ compartment 72, if desired. The front panel 74 is part of a drawer assembly 75 that can be withdrawn from the VCZ compartment 72 to grant a user access to food items stored in the VCZ compartment 72. A handle 76 can be coupled to the front panel 74 to allow a user to pull the drawer assembly 75 to an extended position and thereby access the food items.

The freezer compartment 82 is arranged vertically beneath the VCZ compartment 72. A drawer assembly 81 including one or more freezer baskets 83 can be withdrawn from the freezer compartment 82 to grant a user access to food items stored in the freezer compartment 82. The drawer assembly can be coupled to a freezer door 84 that includes a handle 86. When a user grasps the handle 86 and pulls the freezer door 84 open, at least one or more of the freezer baskets 83 is caused to be at least partially withdrawn from the freezer compartment 82.

The freezer compartment 82 is used to freeze and/or maintain articles of food stored in the freezer compartment 82 in a frozen condition. For this purpose, the freezer compartment 82 is in thermal communication with a freezer evaporator (not shown) that removes thermal energy from the freezer compartment 82 to maintain the temperature therein at a temperature of 0° C. or less during operation of the refrigerator 50, preferably between 0° C. and −50° C., more preferably between 0° C. and −30° C. and even more preferably between 0° C. and −20° C. The freezer compartment 82 is also in communication with the VCZ compartment 72 such that a portion of the cooling air supplied to the freezer compartment 82 can be selectively supplied to the VCZ compartment 72.

Figure 3:
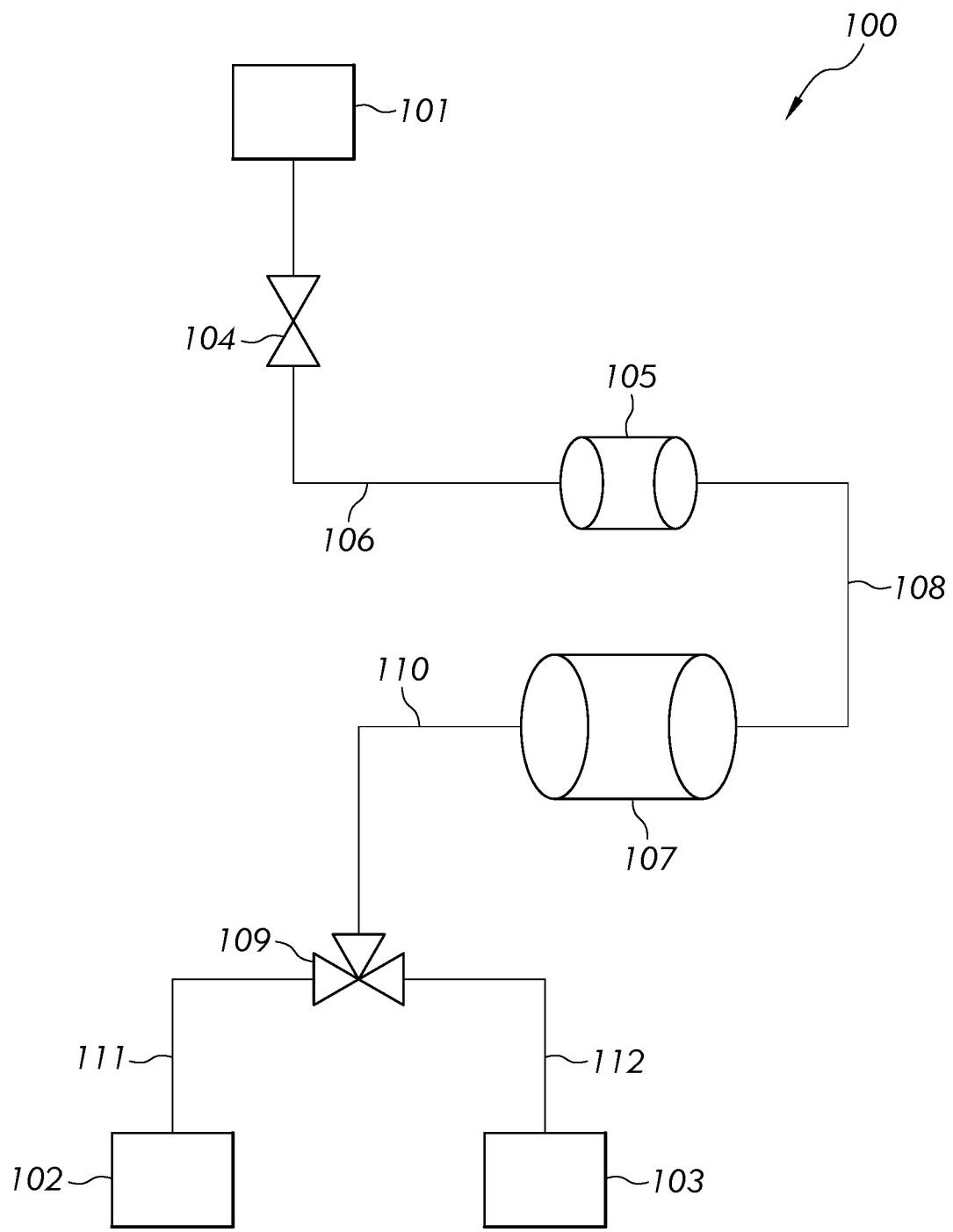
FIG. 3 is a schematic view of a water circuit assembly for the refrigerator of FIG. 1.

Referring now to FIG. 3, a water circuit assembly 100 according to a first embodiment is schematically shown. The water circuit assembly 100 delivers water from a source 101 to a first destination 102 and a second destination 103 spaced apart from the first destination 102. The source 101 of water is positioned outside of the cabinet 51, preferably a pressurized water source such as a conventional water service line, and provides a flow of water to the first and second destinations 102, 103. For example, with reference to FIGS. 1 and 2, the first destination 102 may be the dispenser 62 positioned on an external surface of the door 54 or other location on or inside one of the refrigerator compartments, and the second destination 103 may be the ice maker 64 disposed within the fresh food compartment 52. However, the first and second destinations 102, 103 are not limited thereto and may be any elements of the refrigerator 50 that require water.

The water circuit assembly 100 includes an inlet valve 104 (e.g., an electronic solenoid valve) that selectively permits the flow of water from the source 101 to the water circuit assembly 100. The inlet valve 104 is positioned outside the fresh food compartment 52. In one example, the inlet valve 104 may be located within the machine room (i.e., the externally-accessible compartment that includes the compressor, condenser, etc. at a bottom rear of the refrigerator 50. Further still, the inlet valve 104 may be integral with the source 101.

The inlet valve 104 is in fluid communication with a water filter assembly 105 via a first tube 106. The water filter assembly 105 is positioned downstream from the inlet valve 104 and actively filters the flow of water dispensed from the source 101 to remove impurities, chemicals, or other undesired elements from the inflowing water. After being filtered, the flow of water is then directed to a water tank 107 by a second tube 108. That is, the water filter assembly 105 is in fluid communication with the water tank 107 via the second tube 108. A predetermined amount of water, dependent on the time the inlet valve 104 permits discharging of the flow of water from the source 101, may be stored within water tank 107. The stored water is then quickly available to be used on demand, and further, is chilled via exposure to the cold temperature of the fresh food compartment. Alternatively, the flow of water may pass through the water tank 107 in an unrestricted manner.

Upon mechanical or electronic actuation occurring at the first or second destinations 102, 103, a diverter valve 109 being fluidly connected to the inlet valve 104 diverts the flow of water exiting the water tank 107 to a selected one of the first destination 102 or second destination 103. That is, when a user actuates an element (e.g., lever, switch, proximity sensor, etc.) associated with the first or second destination 102, 103, the inlet valve 104 and the diverter valve 109 are both opened (i.e., actuated to permit the flow of water to pass therethrough in an unrestricted manner) such that water is moved through the water circuit assembly 100 via water pressure originating at the source 101.

Various types of diverter valves can be utilized. In one example, the diverter valve 109 can include two individually operated solenoid valves that each receives input water from water tank 107, and a selected one of the solenoid valves is operated to selectively direct the water to the first or second destination 102, 103. Alternatively, a single three-way valve, such as a ball valve or the like, could be utilized to selectively direct the water to the first or second destination 102, 103. The diverter valve 109 is positioned downstream from and is in fluid communication with the water tank 107 via a third tube 110. Further, the diverter valve 109 is in fluid communication with the first destination 102 and the second destination 103 via fourth and fifth tubes 111, 112, respectively.

Positioning the diverter valve 109 downstream from both the water filter assembly 105 and the water tank 107 reduces cost and complexity of the water circuit assembly 100. Specifically, the entire flow of water from the source 101 passes through the water filter assembly 105 before being diverted to the first or second destinations 102, 103. This negates the need for additional elements (e.g., water filters, water tanks, valves, etc.).

An operative example of the water circuit assembly 100 will now be described wherein a flow of water dispensed from the source 101 is directed to a selected one of the first 102 and second 103 destinations. In one example, upon first use, the user manually charges the system by operating one of the first 102 and second 103 destinations (such as the water dispenser paddle switch) that in turn causes a controller to actuate the inlet valve 104 such that the flow of water from the source 101 may pass through the water circuit assembly 100 and fill the water tank 107. Optionally, the water tank 107 may include a sensor that senses an amount of water stored therein. If the amount of water within the water tank 107 falls below a first predetermined value, the sensor sends a signal to a controller which, in turn, either directly or indirectly actuates the inlet valve 104 such that the flow of water from the source 101 may pass through the water circuit assembly 100.

After the flow of water exits the inlet valve 104, it is then guided by the first tube 106 to the water filter assembly 105. In this manner, the entire flow of water entering the water circuit assembly 100 passes through the water filter assembly 105. Thereafter, the flow of water exits the water filter 105 assembly and is directed to the water tank 107 via the second tube 108. Preferably, the output of the water tank 107 may be open such that the flow of water passes directly through the water tank 107 in an uninterrupted manner. An output valve downstream of the water tank 107, such as diverter valve 109, may be in a closed position such that water is caused to be stored within the water tank 107. Optionally, if a sensor is used on the water tank, then when the amount of water within the water tank 107 reaches a second predetermined value, the sensor sends a signal to the controller which, in turn, actuates the inlet valve 104 such that the flow of water from the source 101 does not enter the water circuit assembly 100.

Water flowing out of the water tank 107 is directed to the diverter valve 109 via the third tube 110. The diverter valve 109 selectively directs the flow of water to the first destination 102 or the second destination 103 based on inputs received from the controller. For example, if the first destination 102 is the dispenser 62, then user interaction with an actuation member (e.g., lever, switch, proximity sensor, etc.) provides a signal to the controller which, in turn, directly or indirectly operates the diverter valve 109 to thereby cause the flow of water to be directed to the dispenser 62 via the fourth tube 111. For example, if the diverter valve 109 includes a pair of individually operated solenoid valves, the particular valve is actuated to cause the water to flow to the first destination 102. It is to be understood that the foregoing operative example is not limited solely thereto and the operation and/or actuation of the elements within the water circuit assembly 100 may be performed by a single controller, multiple controllers, and/or other electronic control units. Likewise, the flow of water to the second destination 103 can similarly occur; where this is used with an icemaker, a controller can call for actuation of the diverter valve 109 during a water fill operation to fill an ice mold with water that will be frozen into ice pieces.

Figure 4:
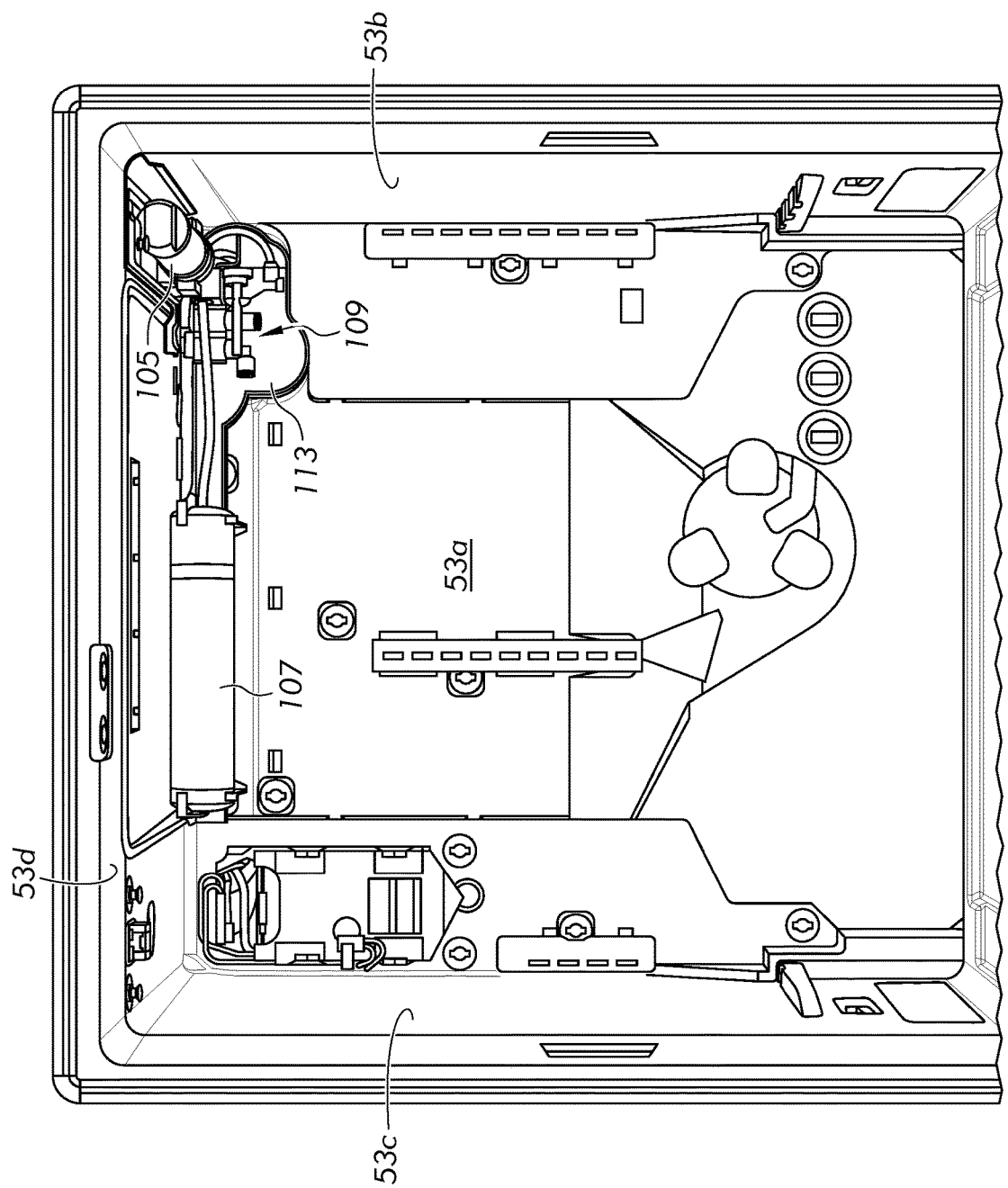
FIG. 4 is a partial perspective view of a liner of the fresh food compartment.

Moving on, as can be seen in FIGS. 1 and 4, the interior liner 53 defining the fresh food compartment 52 includes a rear wall 53a, first and second opposing side walls 53b, 53c, and a top wall 53d. FIG. 1 depicts the ice maker 64 being secured to the top wall 53d at a position adjacent the second side wall 53c of the liner 53. Further, the ice maker 64 extends outwards in a longitudinal direction away from the rear wall 53a. As depicted in FIG. 4, the water filter assembly 105 is positioned adjacent the top wall 53d and the first side wall 53b of the liner 53. Further, the water filter assembly 105 extends outward in a longitudinal direction from the rear wall 53a of the liner 53.

The water circuit assembly 100 further includes a bracket 113 secured to the rear wall 53a of the liner 53. The bracket 113 can be secured to the rear wall 53a by screws, however it is understood that other securing means (e.g., adhesive, hook and loop type fastener, tab/slot configurations, etc.) can be used to secure the bracket 113 to the rear wall 53a. Alternatively, the bracket 113 can be integrally formed with the rear wall 53a such that the bracket 113 and liner 53 are formed simultaneously during a molding operation.

Figure 5:
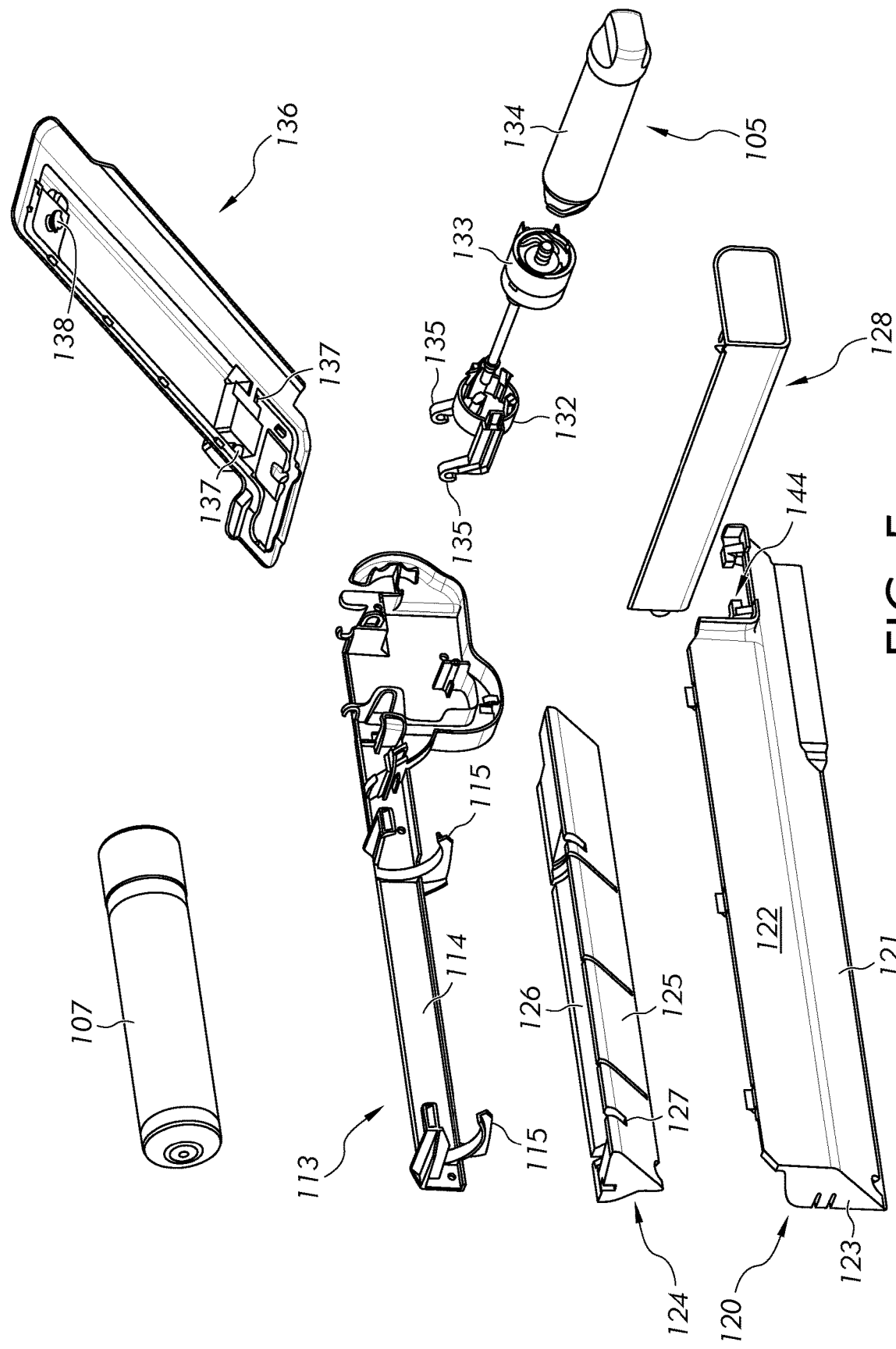
FIG. 5 is an exploded view of the water circuit assembly and first and second housings.

The bracket 113 is positioned adjacent the top wall 53d and extends between the first and second side walls 53b, 53c of the liner 53. As shown in FIG. 5, the bracket 113 has a front surface 114 with at least one arm 115 extending outwards therefrom. Moving back to FIG. 4, the water tank 107 is supported by the bracket 113 along the rear wall 53a of the liner 53. Specifically, as shown in FIG. 6, the water tank 107 is supported by the at least one arm 115, and optionally multiple arms, that extends outwards from the front surface 114 of the bracket 113.

Further still, the diverter valve 109 is secured to the bracket 113 by suitable attachment structure. For example, as shown in FIGS. 5 and 6, the bracket 113 includes a pair of opposing clips 116 extending outwards from the front surface 114. The clips 116 are elastically deformable such that, when the diverter valve 109 is in an installed position, each clip 116 exerts a force in an inward direction on a respective side portion of the diverter valve 109 to removably secure the diverter valve 109 to the bracket 113. However, other attachment structure (e.g., screws, adhesives, etc.) may alternatively be used to attach the diverter valve 109 to the bracket 113.

Figure 6:
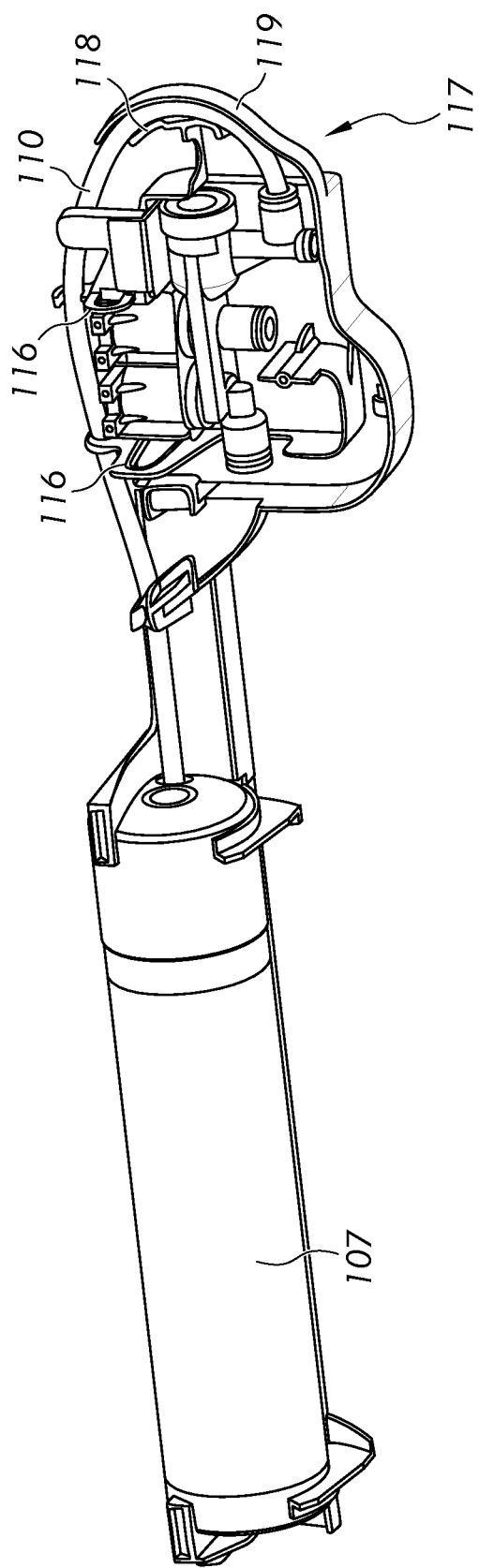
FIG. 6 is a perspective view of a bracket having a water tank and a diverter valve secured thereto.

Further, as show in FIG. 6, the bracket 113 includes at least one bend portion 117. The bend portion 117 is defined by an inner curved wall 118 spaced from an outer curved wall 119. Preferably, the inner and outer walls 118, 119 are uniformly spaced from each other, although other relative spacing is also contemplated. In the shown example, the inner and outer curved walls 118, 119 both extend outward from the front surface 114 of the bracket 113, although optionally the walls could extend outwards from the rear surface of the bracket. Further, the inner and outer curved walls 118, 119 both have a predetermined radial bend. The predetermined radial bend is dependent on a radial bend of a tube entering or exiting the diverter valve (e.g., the third tube 110, fourth tube 111, or fifth tube 112).

Specifically, as shown, the bend portion 117 has a predetermined radial bend that corresponds to a radial bend of the third tube 110. As such, the bend portion 117 is designed to promote a natural shaping of the third tube 110 in an installed position to provide strain relief without exerting unnecessary forces on the radial bend of the third tube 110. In this manner the integrity of an outer circumferential surface of the third tube 110 is preserved and reoccurring replacement of the third tube 110 is less likely to occur. Additionally, during manufacturing, insertion of the third tube 110 into the bend portion 117 can help to affix or retain the third tube 110. Additional clips or guides may also be provided to guide and/or retain the third tube 110, such as the clips or guides shown vertically above the clips 116 in FIG. 6.

Figure 7:
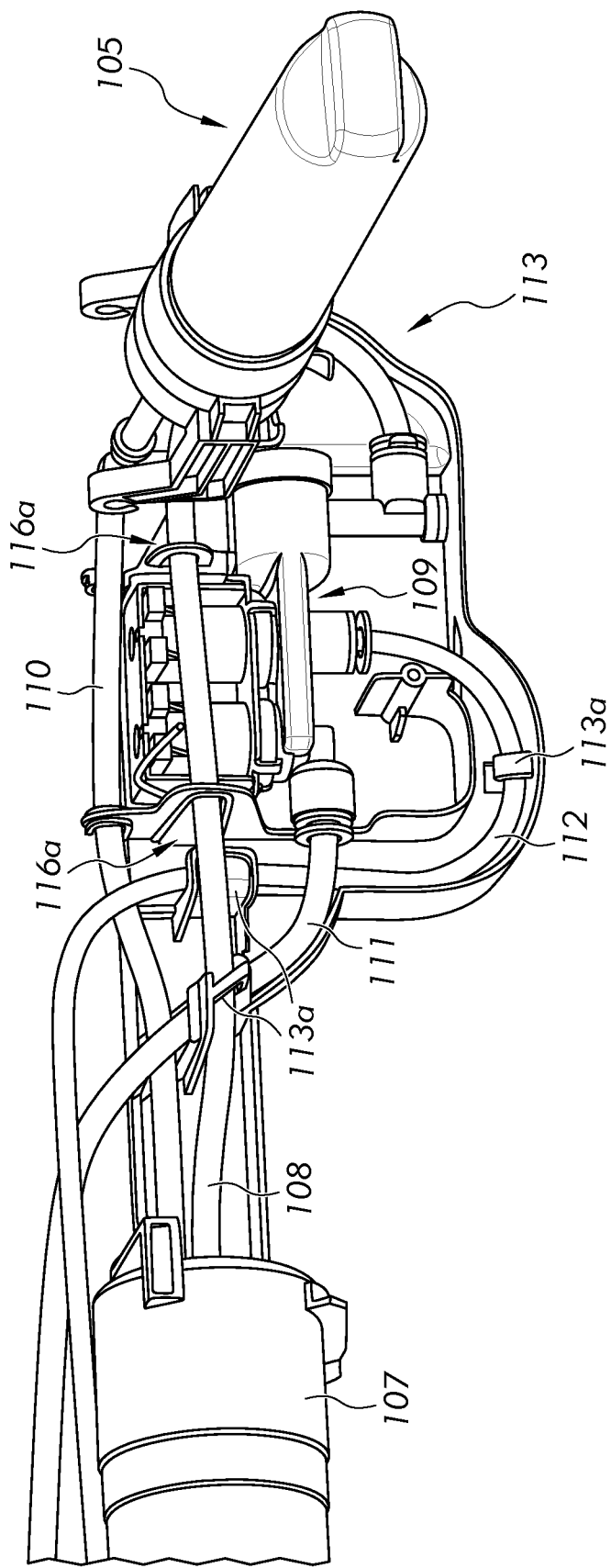
FIG. 7 is another perspective view of the bracket having tubes of the water circuit assembly secured thereto.

Moreover, with reference to FIG. 7, a plurality of retaining mechanisms 113a secure the second, third, fourth and/or fifth tubes 108, 110, 111, 112 to the bracket 113. The retaining mechanisms 113a promote correct positioning of said tubes 108, 110, 111, 112 with respect to the bracket 113 and secure them therein such that the tubes 108, 110, 111, 112 do not protrude a substantial distance away from the front surface 114 of the bracket 113. As depicted, the retaining mechanisms 113a are hooks formed integral with the bracket 113. That is, the bracket 113 and the plurality of retaining mechanisms 113a are formed simultaneously (e.g., via a molding operation). In an alternative example, the plurality of retaining mechanisms 113a may be independent from the bracket 113. For example, the retaining mechanisms 113a can be hook shaped members that are subsequently secured to the bracket 113 (e.g., clamped, fastened, adhered) after the bracket 113 has been formed. As further shown, each opposing clip 116 includes an aperture 116a formed therein which directs the second tube 108 from the water filter assembly 105 to the water tank 107. That is, the second tube 108 passes through the aperture 116a formed in each opposing clip 116 in order to be directed from the water filter assembly 105 to the water tank 107 without being intertwined by other elements (e.g., third tube 110, fourth tube 111, fifth tube 112, etc.).

Figure 8:
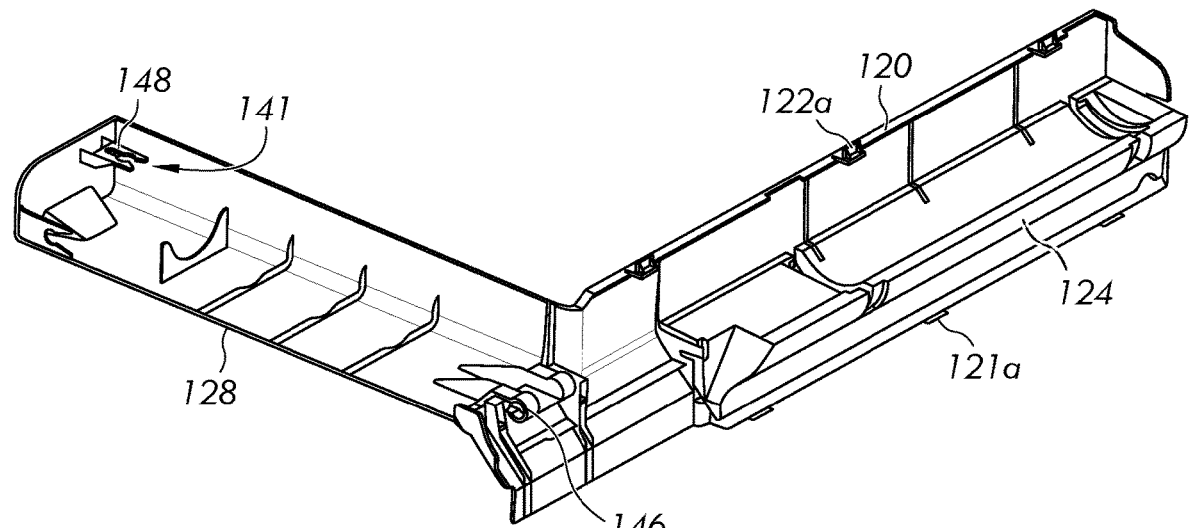
FIG. 8 is a reverse perspective view of the first and second housings.

Referring now to FIGS. 4-5 and 8, a first housing 120 is shown that is secured to the liner 53. Specifically, the first housing 120 includes attaching structure (e.g., clips, tabs, etc.) for securing the first housing 120 to at least one of the top wall 53d and the rear wall 53a of the liner 53. That is, the first housing 120 can be secured to both the top wall 53d and the rear wall 53a of the liner 53. Alternatively, the first housing 120 can be secured to only the top wall 53d or the rear wall 53a of the liner 53.

The first housing 120 extends in a covering relationship over the bracket 113 and water tank 107 so as to enclose the bracket 113 and the water tank 107 within the first housing 120. Further, the first housing 120 extends at least partially between the first and second side walls 53b, 53c of the liner 53. As shown in FIG. 5, the first housing 120 includes a bottom wall 121, a front wall 122 positioned parallel to the rear wall 53a of the liner 53, and at least one side wall 123 being perpendicular to the front wall 122 of the first housing 120. Due to this configuration, the first housing 120 acts as a cover that can be efficiently attached to and removed from the liner 53 to provide selective access to the bracket 113 and water tank 107.

In one example, as depicted in FIG. 8, at least one tab 122a is positioned at a top side of the front wall 122 of the first housing 120. Further, at least one tab 121a is positioned at a bottom side of the bottom wall 121 of the first housing 120. In an installed position, the tab 122a positioned at the top side of the front wall 122 and the tab 121a positioned at the bottom side of the bottom wall 121 are received within recessed slots provided in the top wall 53d and the rear wall 53a of the liner 53, respectively. In this manner, the first housing 120 is secured to both the top wall 53d and the rear wall 53a of the liner 53.

When the first housing 120 is in the installed position an insulation member 124 is positioned within the first housing 120 and adjacent to the water tank 107. Specifically, the insulation member 124 includes a bottom surface 125 and a top surface 126. The bottom surface 125 is shaped to correspond to a back side of the bottom wall 121 of the first housing 120 and the top surface 126 is shaped to correspond to a peripheral surface of the water tank 107. In this way, the water tank 107 can rest partially recessed into the insulation member 124, which can help to ensure that the temperature of the water tank 107 stays fairly consistent over time, and also that the water does not freeze inside the water tank 107.

Further, the insulation member 124 includes a slot 127 formed therein and configured to accept the arm 115 extending from the front surface 114 of the bracket 113. That is, the position of the slot 127 within the insulation member 124 corresponds to the position that the arm 115 extends from the front surface 114 of the bracket 113. In this manner, when the first housing 120 and insulation member 124 are in the installed position, the arm 115 is positioned within the slot 127 and the top surface 126 of the insulation member 124 contacts the peripheral surface of the water tank 107.

Figure 9:
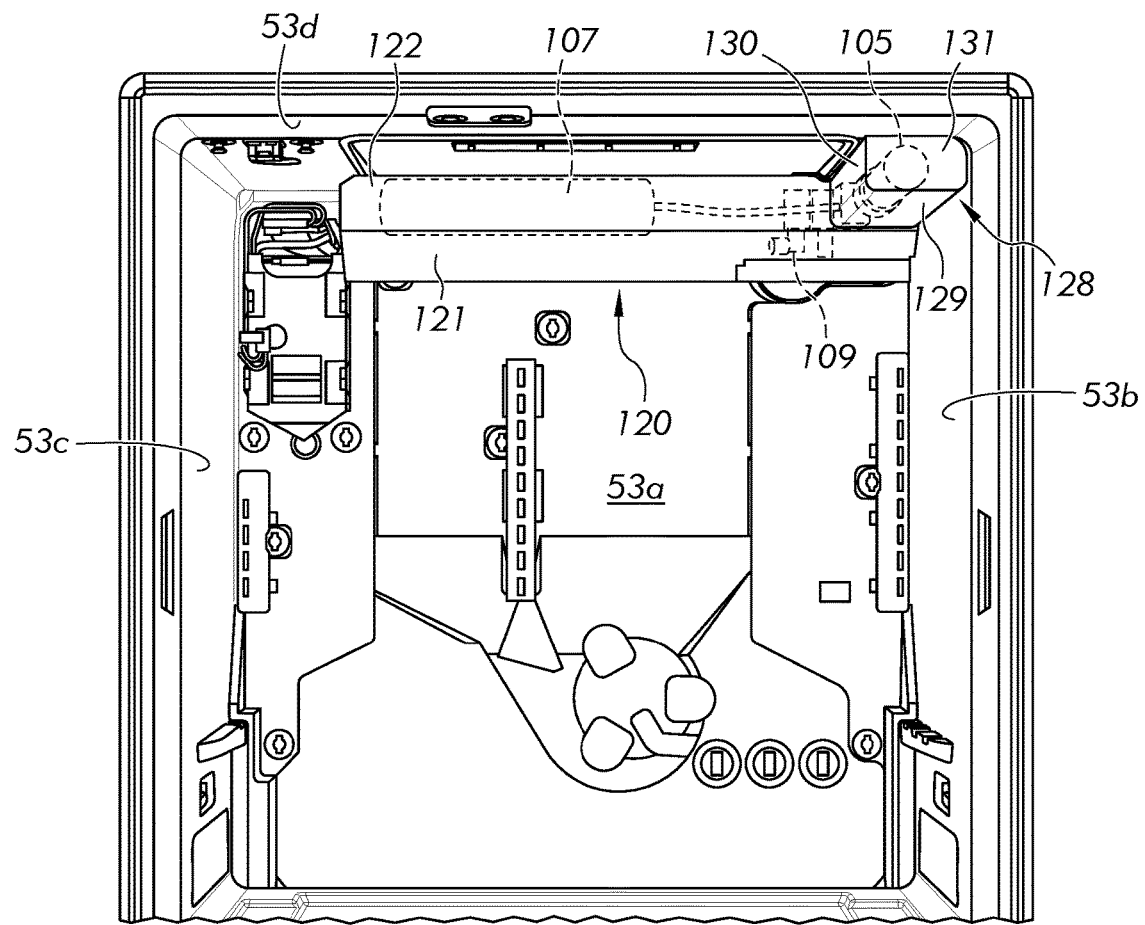
FIG. 9 is a partial perspective view of the liner of the fresh food compartment shown in FIG. 4 with the first and second housings secured thereto.

As shown in FIGS. 5 and 8-9, a second housing 128 is provided that is removably attached to the top wall 53d. With reference to FIG. 9, the first and second housings 120, 128 are depicted in an installed position. Specifically, the first housing 120 is shown as concealing the water tank 107 and the diverter valve 109 (both represented by dashed lines). Further, the second housing 128 is positioned about the water filter assembly 105 (represented by dashed lines) so as to enclose and conceal the water filter assembly 105 within the second housing 128.

The second housing 128 includes a bottom wall 129, a side wall 130 and a front face 131. In the installed position, the bottom wall 129, side wall 130, and front face 131 of the second housing 128 are parallel to the top wall 53d, first side wall 53b, and rear wall 53a of the liner 53, respectively. As will be discussed in detail below, the second housing 128 is pivotally connected to the first housing such that the second housing 128 is capable of rotating in a downward direction with respect to the first housing.

As briefly noted above, a separate embodiment will now be discussed detailing the relationship between the first and second housings 120, 128, as well as the relationship between the water filter assembly 105 and the top wall 53d of the liner 53. It is to be understood that the foregoing disclosure of the various elements of the refrigerator 50 are separate and distinct from the additional embodiment discussed below. That is, while the following example embodiment details elements of the refrigerator 50 according to the foregoing example embodiment, the former is not limited to the configuration of the latter and may be employed in other refrigerator configurations.

Referring back now to FIG. 5, the water filter assembly 105 is pivotally connected to the top wall 53d of the liner 53 at a first pivot point. In this manner, a front end of the water filter assembly 105 may be rotated in an upwards or downwards direction. As shown, the water filter assembly 105 includes a base member 132, a connection head 133 removably secured to the base member 132, and a water filter 134 removably secured to the connection head 133. The base member 132 includes a pair of arms 135, wherein each arm of the pair of arms 135 includes a hook at a distal end thereof.

Moreover, a panel 136 is positioned vertically above the water filter assembly 105. Optionally, the panel 136 may be separate and distinct from the liner 53. Alternatively, the panel 136 can be integrally formed with the liner 53 such that the panel 136 and liner 53 are formed simultaneously during a molding operation. The panel 136 includes a bar 137 that is spaced vertically below an inner surface of the panel 136 and extends between opposing inner surfaces of the panel 136. The bar 137 may extend continuously between the opposing inner surfaces of the panel 136 or, alternatively, an intervening structure may exist between the opposing inner surfaces of the panel 136 such that the bar 137 is sectioned into first and second bars. In addition, the bar 137 may be integrally formed with the panel 136 or, alternatively, may be separately manufactured and subsequently installed within the panel 136.

In an installed position, the water filter assembly 105 is positioned directly below the panel 136 and is rotatably attached thereto at one end. Specifically, each respective hook of the pair of arms 135 is disposed around the bar 137 of the panel 136 such that the engagement between the hooks and the bar 137 defines the first pivot point. In one example, the water filter assembly 105 may be pulled by the force of gravity to rotate downwards so that each respective hook of the pair of arms 135 pivots about the bar 137 (i.e., about the first pivot point). Optionally, the water filter assembly 105 may be biased (e.g., by a spring, not shown) such that, in the installed position, the water filter assembly 105 lies on a longitudinal axis that is parallel to the top wall 53d of the liner 53. In this manner, when a user applies a force (i.e., greater than the biasing force of the spring) to the front end of the water filter assembly 105 in a downward direction, each respective hook of the pair of arms 135 pivots about the bar 137 (i.e., about the first pivot point) which, in turn, rotates the front end of the water filter assembly 105 in a downward direction.

As will now be further described, the second housing 128 is removably attached to the top wall 53d of the liner 53 and pivotally connected to the first housing 120 at a second pivot point. That is, in a closed positioned which is shown in FIG. 9, the second housing 128 is removably secured to the top wall 53d of the liner 53 and is positioned about the water filter assembly 105 so as to enclose the water filter assembly 105 within the second housing 128. Optionally, the second housing 128 can support the water filter assembly 105 against the force of gravity. Further, in a rotating position which is detailed in FIG. 12, a front end of the second housing 128 is capable of being rotated in a vertically downward direction due to the second housing 128 being pivotally connected to the first housing 120.

Figure 10:
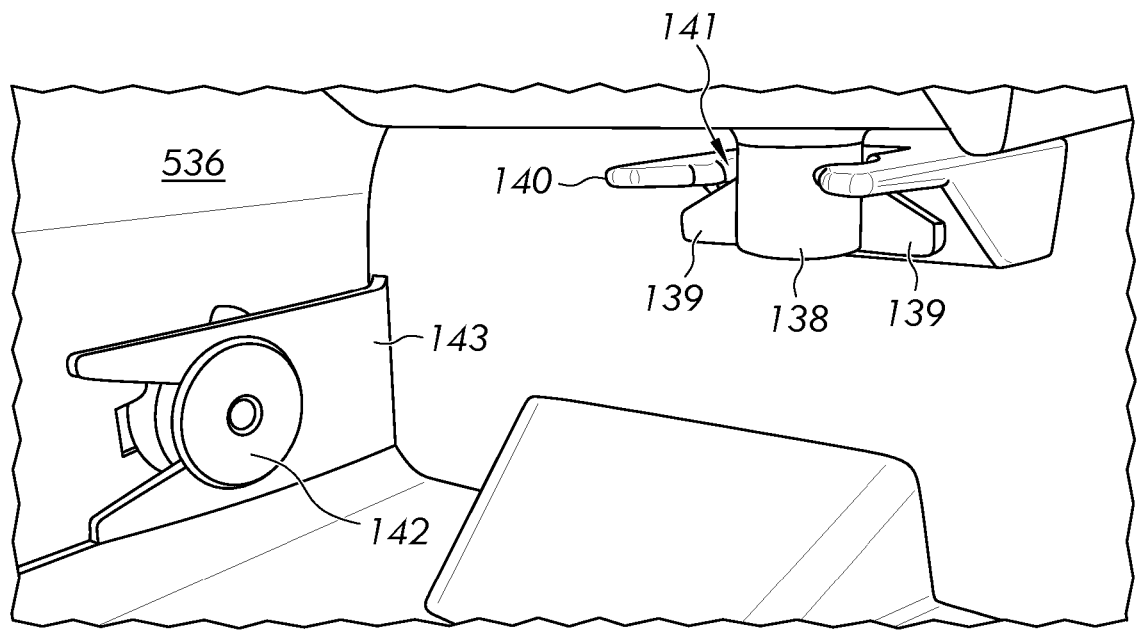
FIG. 10 is a perspective view of an internal area of the second housing in the closed position.

With reference to FIG. 10, the panel 136 includes a cylindrical anchor 138 that extends vertically downward from the inner surface of the panel 136. The cylindrical anchor 138 includes at least one flange member 139 that extends radially outwards from a circumferential surface of the cylindrical anchor 138. Preferably, as shown, the cylindrical anchor 138 includes two flange members 139 and is formed integral with the panel 136 such that the cylindrical anchor 138 and panel 136 are formed simultaneously during a molding operation. Alternatively, the cylindrical anchor 138 may be a separate and distinct element from the panel 136 that is subsequently attached thereto.

As further depicted, the second housing 128 includes a support member 140 that extends outwards and away from an inner surface of the second housing 128. The support member 140 includes a reception area 141 that selectively accepts the cylindrical anchor 138 therein. Specifically, the support member 140 is a horizontally disposed plate wherein the reception area 141 is positioned at a distal end thereof and is shaped to partially correspond to the circumferential surface of the cylindrical anchor 138. That is, the reception area 141 is an opening at the distal end of the support member 140 wherein said opening is radially larger than that of the cylindrical anchor 138. The support member 140 abuts the flange member(s) 139 to hold the second housing 128 in the closed position against the force of gravity.

Further still, the first side wall 53b of the liner 53 includes a second cylindrical anchor 142 that engages with a second support member 143 that extends outwards and away from the inner surface of the second housing 128. The second support member 143 is designed in the same manner as the above described support member 140 in that, the second support member 143 includes a reception area which is defined as an opening at a distal end of the second support member 143 that selectively abuts and accepts the second cylindrical anchor 142 therein. The second support member 143 inhibits lateral movement of the second housing 128 away from the first side wall 53b.

Figure 11:
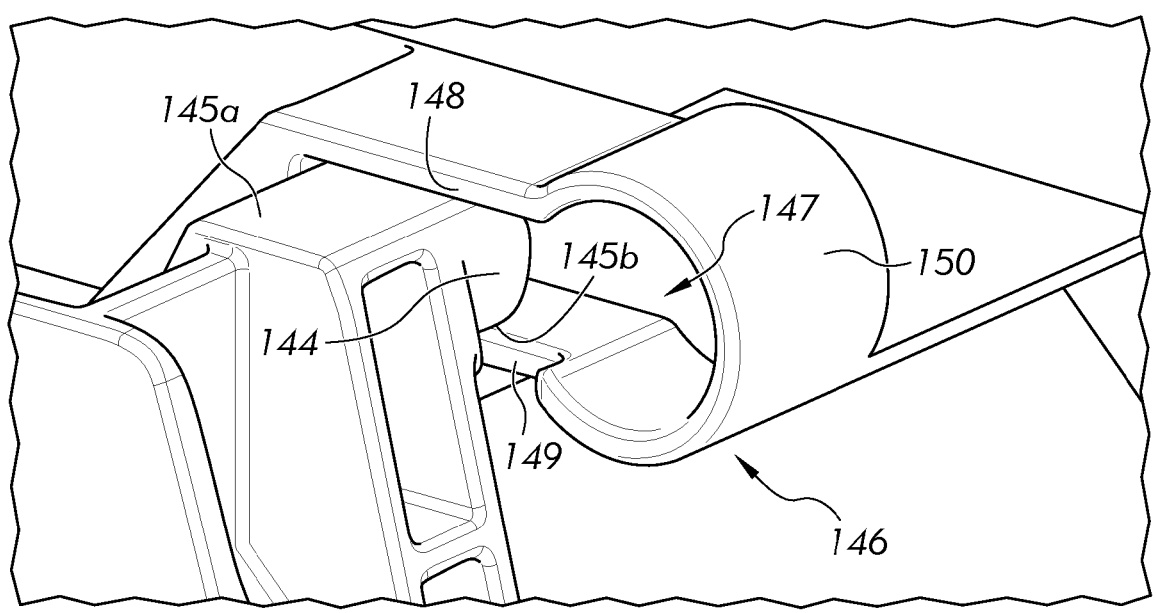
FIG. 11 is a perspective view of the engagement between a rotation pin and a rotation mechanism of the first and second housings, respectively, in the closed position.

The second housing 128 is configured to pivot downwards to selectively provide access to the water filter assembly 105. With reference to FIGS. 5 and 11, the first housing 120 includes a pair of laterally spaced rotation pins 144 which face one another. Specifically, the pair of laterally spaced rotation pins 144 are positions on the first housing 120 at an end closest to the first side wall 53b of the liner 53. The pair of laterally spaced rotation pins 144 are integrally formed with the first housing 120. However, in alternative embodiments, the pair of laterally spaced rotation pins 144 can be separate and distinct elements that are subsequently secured to the first housing 120. Further, as depicted in FIG. 11, each rotation pin 144 of the pair of laterally spaced rotation pins 144 has a generally cylindrical shape. Specifically, each rotation pin 144 includes a flat top surface 145a and optionally a flat bottom surface 145b.

Moreover, as best shown in FIGS. 8 and 11, the second housing 128 includes a pair of laterally spaced rotation mechanisms 146 facing away from one another and each corresponding, in shape, geometry, and position, to a related rotation pin 144. Each rotation mechanism 146 is formed into a rear portion of the second housing 128. Further, as depicted in FIG. 11, each rotation mechanism 146 includes an elongated linear slot 147 that is defined by the space between an upper extension 148 and a vertically spaced lower extension 149. The upper and lower extensions 148, 149 are horizontally oriented and are both parallel with the top wall 53d of the liner 53. Also, the vertical distance spanning between the upper and lower extensions 148, 149 is equal to, and preferably greater than, the vertical distance between the flat top and bottom surfaces 145a, 145b of the rotation pin 144. Further still, a closed circular end 150 continuously connects the upper and lower extensions 148, 149. The closed circular end 150 is generally cylindrical in design and has a radial dimension equal to, and preferably greater than, that of the rotation pin 144.

The closed position of the second housing 128 will now be further described with reference to FIGS. 9-11. Initially, as depicted in FIG. 10, when the second housing 128 is in the closed position, the cylindrical anchor 138 of the panel 136 is positioned within the reception area 141 of the support member 140. Specifically, a bottom surface of the support member 140 physically contacts the flange member 139 so as to support the second housing 128 in a vertical direction.

Further, as shown in FIG. 11, when the second housing 128 is in the closed position, the pair of rotation pins 144 of the first housing 120 are positioned within the pair of rotation mechanisms 146 formed into the rear portion of the second housing 128, respectively. Specifically, the each rotation pin 144 extends within each respective slot 147 such that the flat top surface 145a and the flat bottom surface 145b of each rotation pin 144 are disposed adjacent the upper extension 148 and lower extension 149 of each slot 147, respectively.

The rotating position of the second housing 128 will now be further described with reference to FIGS. 10-13. Initially, a user grasps an exterior surface of the second housing 128 (e.g., via a handle, etc.) and pulls the second housing 128 horizontally outwards away from the rear wall 53a of the liner 53. In doing so, the support member 140 traverses away from the flange member 139 such that the cylindrical anchor 138 is not positioned within the reception area 141 which, thereby, allows removal of the second housing from the panel 136.

Figure 12:
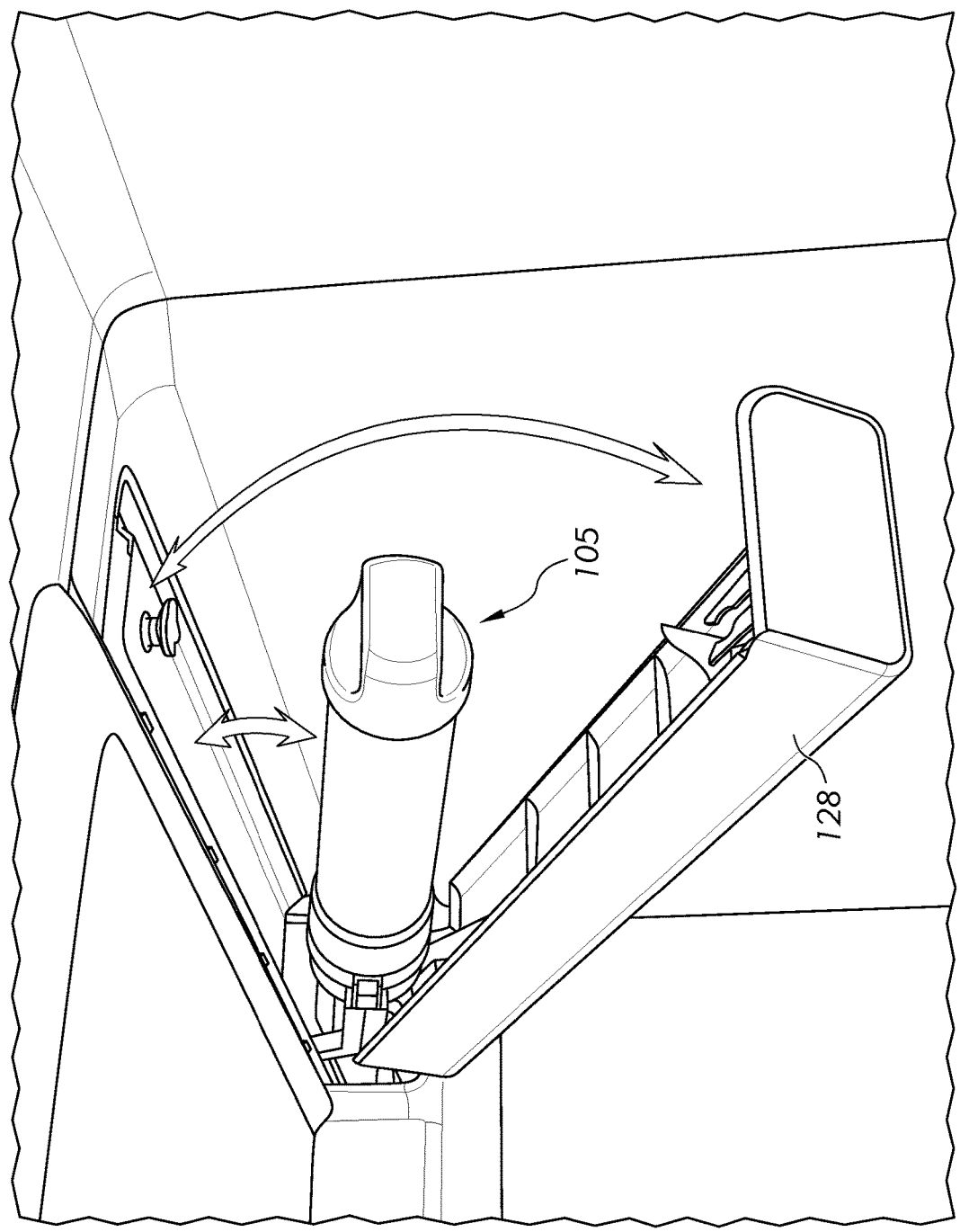
FIG. 12 is a perspective view of the second housing and a water filter assembly, both in an opened position.

Further, as the user pulls the second housing 128 away from the rear wall 53a of the liner 53, each slot 147 of the pair of rotation mechanisms 146 traverses linearly in the same direction until each rotation pin 144 is positioned within the respective closed circular end 150. The engagement between each rotation pin 144 and each respective closed circular end 150 defines the second pivot point. In this manner, as depicted in FIG. 12, the second housing 128 can be rotated about the second pivot point such that the front end of the second housing 128 is rotated downwards to expose and allow a user access to the water filter assembly 105.

Figure 13:
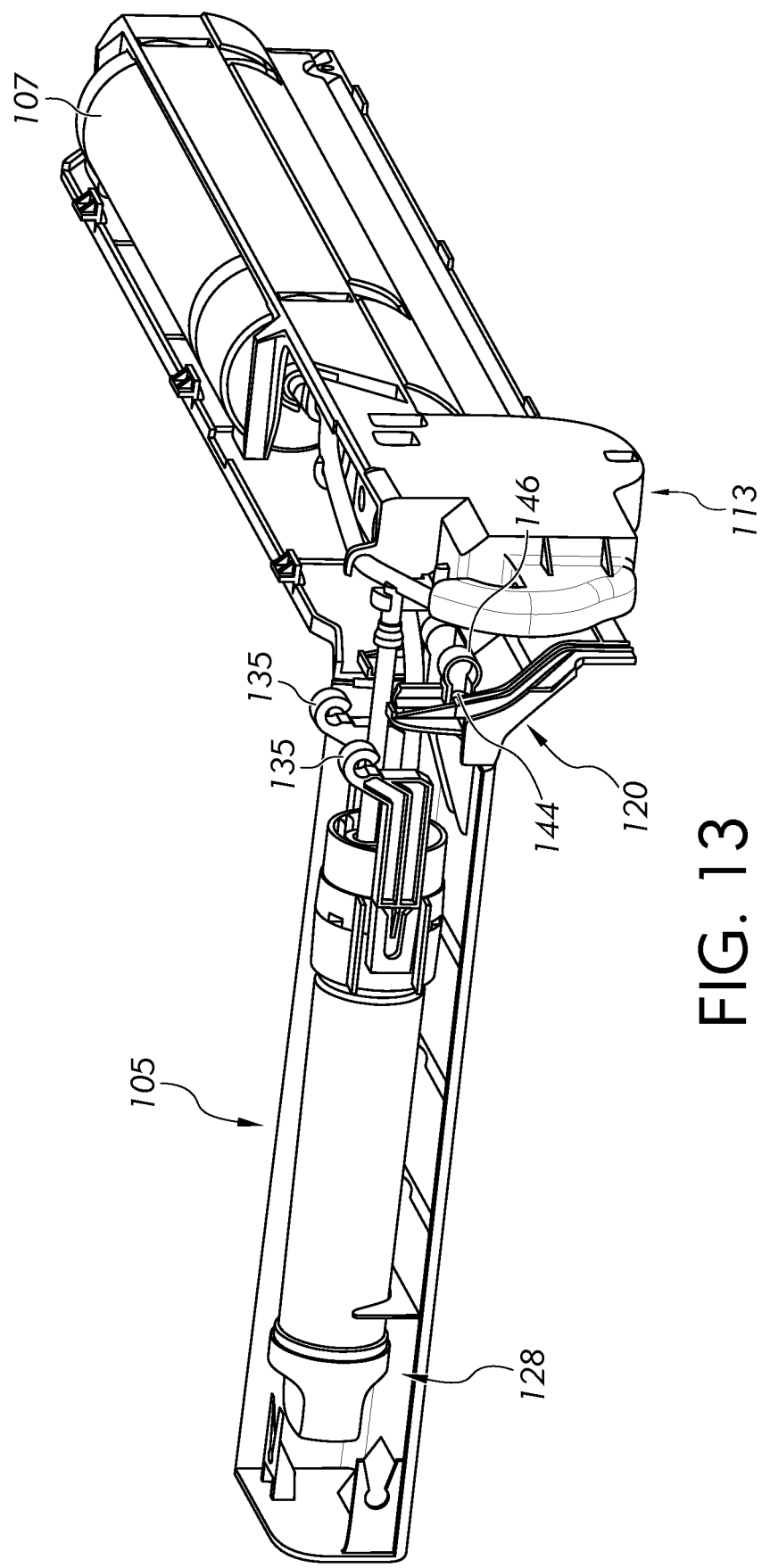
FIG. 13 is perspective view of a water filter assembly concealed by the second housing in the closed position.

Further still, as shown in FIG. 13, the first pivot point (i.e., at the hook of the pair of arms 135), about which the water filter assembly 105 rotates, is vertically and laterally offset from the second pivot point (i.e., at the pair of laterally spaced rotation mechanisms 146 of the second housing 128), about which the second housing 128 rotates. In this manner, the second housing 128 and the water filter assembly 105 are independently rotatable in a downward direction with respect to the top wall 53d of the liner 53. Thus, with reference to FIG. 12, after the water filter assembly 105 has been rotated downward, the user can then rotate the water filter 134 in a counter-clockwise direction with respect to the connection head 133 in order to remove the water filter 134 from the water filter assembly 105 for maintenance and/or replacement.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims and their equivalents.

The invention claimed is:

1. A refrigerator comprising:
   a cabinet;
   a liner defining a compartment within the cabinet, the liner including a rear wall, first and second opposing side walls, and a top wall;
   a water circuit assembly configured to deliver water from a source to a first destination and a second destination spaced apart from the first destination, wherein the water circuit assembly comprises:

a water filter assembly positioned adjacent the top wall and the first side wall of the liner and extending outward from the rear wall of the liner,
a bracket secured to the rear wall of the liner and positioned adjacent the top wall, the bracket extending between the first and second side walls of the liner,
a water tank supported by the bracket along the rear wall of the liner, and
a diverter valve attached to the bracket and fluidly connected to an inlet valve to thereby divert the flow of water from the inlet valve to a selected one of the first destination or the second destination,
wherein the water tank is supported by the bracket by at least one arm that extends outwards from a front surface of the bracket,
a first housing that is secured to at least one of the top wall and the rear wall of the liner, the first housing extending in a covering relationship over the bracket so as to enclose the bracket and the water tank within the first housing; and
an insulation member positioned within the first housing and adjacent to the water tank, the insulation member including a slot formed therein and configured to accept the arm extending from the front surface of the bracket such that, in an installed position, a top surface of the insulation member contacts a peripheral surface of the water tank.

2. The refrigerator of claim 1, wherein the inlet valve is positioned outside of the compartment and is configured to selectively permit a flow of water from the source to the water circuit assembly, wherein the inlet valve is in fluid communication with the water filter assembly via a first tube, the water filter assembly is in fluid communication with the water tank via a second tube, the water tank is in fluid communication with the diverter valve via a third tube, and the diverter valve is in fluid communication with the first destination and the second destination via fourth and fifth tubes, respectively.

3. The refrigerator of claim 1, further comprising a second housing removably attached to the top wall and positioned about the water filter assembly so as to enclose the water filter assembly within the second housing, wherein the second housing is pivotally connected to the first housing and wherein the second housing is configured to rotate in a downward direction with respect to the first housing.

4. The refrigerator of claim 1, further comprising:
a door that is pivotally connected to the cabinet to selectively provide access to the compartment, an external surface of the door including a water dispenser; and
an ice maker disposed within the compartment and secured to the top wall at a position adjacent the second side wall of the liner, wherein the first destination and second destination are the water dispenser and the ice maker, respectively.

5. The refrigerator of claim 1, wherein the bracket includes at least one bend portion, wherein the bend portion is defined by an inner curved wall extending outward from a front surface of the bracket and an outer curved wall extending outward from the front surface of the bracket, wherein a uniform space is disposed between the inner curved wall and the outer curved wall, wherein the inner curved wall and outer curved wall have a predetermined radial bend, and wherein a tube of the water circuit assembly is disposed within the uniform space positioned between the inner curved wall and the outer curved wall.

6. The refrigerator of claim 1, wherein the water filter assembly comprises a base member, a connection head removably secured to the base member, and a water filter removably secured to the connection head.

7. The refrigerator of claim 1, wherein the compartment within the cabinet includes a first compartment disposed vertically above a second compartment, said first compartment having a target temperature above zero degrees Centigrade, and wherein the refrigerator further comprises:
a partition dividing said second compartment into an upper compartment and a lower compartment, said lower compartment having a user-selectable target freezer temperature, said upper compartment having a user-selectable target variable climate zone temperature between a predetermined temperature below zero degrees Centigrade and a predetermined temperature above zero degrees Centigrade.

8. A refrigerator comprising:
a cabinet;
a liner defining a compartment within the cabinet, the liner including a rear wall, first and second opposing side walls, and a top wall;
a water circuit assembly configured to deliver water from a source to a first destination and a second destination spaced apart from the first destination, wherein the water circuit assembly comprises:
a water filter assembly positioned adjacent the top wall and the first side wall of the liner and extending outward from the rear wall of the liner,
a bracket secured to the rear wall of the liner and positioned adjacent the top wall, the bracket extending between the first and second side walls of the liner,
a water tank supported by the bracket along the rear wall of the liner, and
a diverter valve attached to the bracket and fluidly connected to an inlet valve to thereby divert the flow of water from the inlet valve to a selected one of the first destination or the second destination,
wherein the water filter assembly comprises a base member, a connection head removably secured to the base member, and a water filter removably secured to the connection head, and
wherein the top wall of the liner includes a panel having a bar vertically spaced below an inner surface of the panel and extending between opposing inner side surfaces of the panel, and wherein the base member of the water filter assembly includes a pair of arms, wherein each arm of the pair of arms includes a hook at a distal end thereof, and wherein, in an installed position, the hook is disposed around the bar of the panel such that engagement between the hook and the bar defines a first pivot point.

9. A refrigerator comprising:
a cabinet;
a liner defining a compartment within the cabinet, the liner including a rear wall, first and second opposing side walls, and a top wall;
a water filter assembly positioned adjacent and extending along the first side wall of the liner, the water filter assembly being pivotally connected to the top wall at a first pivot point;
a first housing secured to at least one of the top wall and the rear wall of the liner, the first housing extending between the first and second side walls of the liner; and
a second housing positioned about the water filter assembly so as to enclose the water filter assembly within the second housing, the second housing being removably attached to the top wall of the liner and pivotally connected to the first housing at a second pivot point, wherein the first pivot point is vertically and laterally offset from the second pivot point such that the second housing and the water filter assembly are independently rotatable in a downward direction with respect to the top wall of the liner, wherein the water filter assembly comprises a base member, a connection head removably secured to the base member, and a water filter removably secured to the connection head, wherein the top wall of the liner includes a panel having a bar vertically spaced below an inner surface of the panel and extending between opposing inner side surfaces of the panel, and wherein the base member of the water filter assembly includes a pair of arms, wherein each arm of the pair of arms includes a hook at a distal end thereof, and wherein, in an installed position, the hook is disposed around the bar of the panel such that engagement between the hook and the bar defines the first pivot point.

10. The refrigerator of claim 9, further comprising a water tank positioned adjacent the rear wall and top wall of the liner, wherein the first housing extends in a covering relationship over the water tank so as to enclose the water tank within the first housing.

11. The refrigerator of claim 9, wherein the panel further comprises a cylindrical anchor that extends vertically downward from the inner surface of the panel, the cylindrical anchor including at least one flange member extending radially outwards from a circumference of the cylindrical anchor.

12. The refrigerator of claim 11, wherein the second housing comprises a support member extending from an inner surface of the second housing, the support member including a reception area that is configured to selectively accept the cylindrical anchor therein such that:
   in a closed position, the cylindrical anchor is positioned within the reception area and a bottom surface of the support member contacts the at least one flange member so as to support the second housing in a vertical direction, and
   in a rotating position, the cylindrical anchor is not positioned within the reception area so as to allow removal of the second housing from the panel.

13. The refrigerator of claim 12, wherein the first housing includes a pair of laterally spaced rotation pins which face one another, wherein each rotation pin includes a flat top surface and a flat bottom surface.

14. The refrigerator of claim 13, wherein the second housing includes a pair of laterally spaced rotation mechanisms facing away from one another and that are each formed into a rear portion of the second housing, each rotation mechanism including a slot being defined between an upper extension and a vertically spaced lower extension, and a closed circular end that continuously connects the upper extension and the lower extension of the slot.

15. The refrigerator of claim 14, wherein
   in the closed position, the pair of rotation pins of the first housing are positioned within the pair of rotation mechanisms formed into the rear portion of the second housing, respectively, such that the flat top surface and the flat bottom surface of each rotation pin are disposed adjacent the upper extension and lower extension of each slot, respectively, and
   in the rotating position, the pair of rotation pins are positioned within the pair of rotation mechanisms, respectively, such that each rotation pin is positioned within the respective closed circular end, and wherein engagement between each rotation pin and each closed circular end defines the second pivot point.

* * * * *